United States Patent
Grewal et al.

(10) Patent No.: US 11,308,187 B2
(45) Date of Patent: Apr. 19, 2022

(54) USER AUTHENTICATION

(71) Applicant: Hewlett-Packard Development Company, L.P., Spring, TX (US)

(72) Inventors: Gurchetan Grewal, Bristol (GB); Daniel Ellam, Bristol (GB); Joshua S. Schiffman, Bristol (GB); James M. Mann, Houston, TX (US)

( * ) Notice: Subject to any disclaimer, the term of this patent is extended or adjusted under 35 U.S.C. 154(b) by 263 days.

(21) Appl. No.: 16/473,332

(22) PCT Filed: Apr. 11, 2017

(86) PCT No.: PCT/US2017/027035
§ 371 (c)(1),
(2) Date: Jun. 25, 2019

(87) PCT Pub. No.: WO2018/190812
PCT Pub. Date: Oct. 18, 2018

(65) Prior Publication Data
US 2021/0279311 A1  Sep. 9, 2021

(51) Int. Cl.
*G06F 21/31* (2013.01)
*G06F 21/45* (2013.01)

(52) U.S. Cl.
CPC ............ *G06F 21/316* (2013.01); *G06F 21/45* (2013.01)

(58) Field of Classification Search
CPC ...... G06F 21/316; G06F 21/31; G06F 21/604; G06F 16/122
See application file for complete search history.

(56) References Cited

U.S. PATENT DOCUMENTS

| 7,908,645 B2 | 3/2011 | Varghese et al. |
| 8,286,227 B1 | 10/2012 | Zheng |

(Continued)

FOREIGN PATENT DOCUMENTS

| EP | 2458524 | 5/2012 |
| WO | WO-1997007448 A2 | 2/1997 |
| WO | WO-2015158874 A1 | 10/2015 |

OTHER PUBLICATIONS

Mondal, S., et al.; "Continuous Authentication Using Behavioural Biometrics"; Jan. 30, 2014; 10 pages.

(Continued)

*Primary Examiner* — Tongoc Tran
(74) *Attorney, Agent, or Firm* — HP Inc. Patent Department

(57) ABSTRACT

Examples associated with user authentication are described. One example system includes a set of authentication modules. A data store stores data describing disruption ratings of members of the set of authentication modules. A user confidence module maintains a confidence rating that a current user of a device is an authenticated user of the device. The confidence module controls execution of the authentication modules based on the confidence rating and on the disruption ratings of the authentication modules. The user confidence module controls execution of relatively less disruptive authentication modules when the user confidence module is confident that the current user of the device is the authenticated user of the device. The user confidence module maintains the confidence rating based on feedback received from authentication modules.

20 Claims, 6 Drawing Sheets

(56) References Cited

U.S. PATENT DOCUMENTS

| | | | |
|---|---|---|---|
| 8,719,911 | B2 | 5/2014 | Novack et al. |
| 9,160,730 | B2 | 10/2015 | Sheller et al. |
| 9,485,237 | B1 | 11/2016 | Johansson et al. |
| 10,097,529 | B2* | 10/2018 | Kang .................... H04W 12/50 |
| 2010/0321155 | A1* | 12/2010 | Ballard ................ H04L 9/3231 |
| | | | 340/5.81 |
| 2012/0144468 | A1* | 6/2012 | Pratt ....................... G06F 21/45 |
| | | | 726/7 |
| 2013/0055348 | A1* | 2/2013 | Strauss .................. G06F 21/40 |
| | | | 726/3 |
| 2013/0239195 | A1 | 9/2013 | Turgeman |
| 2014/0007227 | A1 | 1/2014 | Morinaga et al. |
| 2014/0013422 | A1 | 1/2014 | Janus et al. |
| 2015/0373007 | A1 | 12/2015 | Sheller et al. |
| 2016/0063503 | A1 | 3/2016 | Kobres et al. |
| 2016/0227411 | A1 | 8/2016 | Lundblade et al. |
| 2017/0109509 | A1* | 4/2017 | Baghdasaryan ........ G06F 21/32 |
| 2017/0257367 | A1* | 9/2017 | Han ...................... H04L 63/205 |
| 2019/0294766 | A1* | 9/2019 | Douglas ................ G06F 21/629 |

OTHER PUBLICATIONS

Riva, O. et al., Progressive Authentication: Deciding When to Authenticate on Mobile Phones, Aug. 8, 2012, < http://homes.cs.washington.edu/~kstrauss/publications/pa.pdf >.

\* cited by examiner

USER AUTHENTICATION

BACKGROUND

Device security is a growing concern today. While some device security issues involve preventing malicious code from running on devices, other device security issues involve ensuring that only authorized users are allowed to access devices to prevent unauthorized access to the devices, and/or the resources, data, and so forth that are accessible via the devices. Today, devices rely on authentication techniques to ensure that users of the device have permission to operate the device. These authentication techniques may involve a password, a biometric, an authenticating device carried by a user, and so forth.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with user authentication are described. After a user obtains access to a device (e.g., by entering a password), the device may seek to ensure that the current user of the device does not change from an authenticated user to an unauthenticated user during use of the device. However, the device may also seek to avoid regularly interrupting the current user of the device to force the current user to actively authenticate themselves, as this may cause the authenticated user to disable certain security settings. Consequently, the device may instead use a set of ratings for a variety of authentication techniques in combination with a confidence rating that describes a likelihood the current user is the authenticated user. The confidence rating may be used to determine which of the authentication techniques to use at any given time.

The ratings for the authentication techniques may include, for example, disruption ratings describing how likely an authentication technique is to impact or interrupt the user, privacy ratings describing how much an authentication technique invades the privacy of a user, system resource impact ratings describing how resource intensive an authentication technique is, and so forth. As the device becomes less confident that the current user of the device is the authenticated user, the device may select, based on the ratings for the authentication techniques, more disruptive, privacy invasive, or resource intensive authentication techniques to attempt to increase certainty regarding whether the current user is the authenticated user. Eventually, if the confidence rating falls below a certain threshold, the device may restrict access to the device or a resource available to the device until the authenticated user re-authenticates themselves (e.g., by reentering their password).

Figure 1:
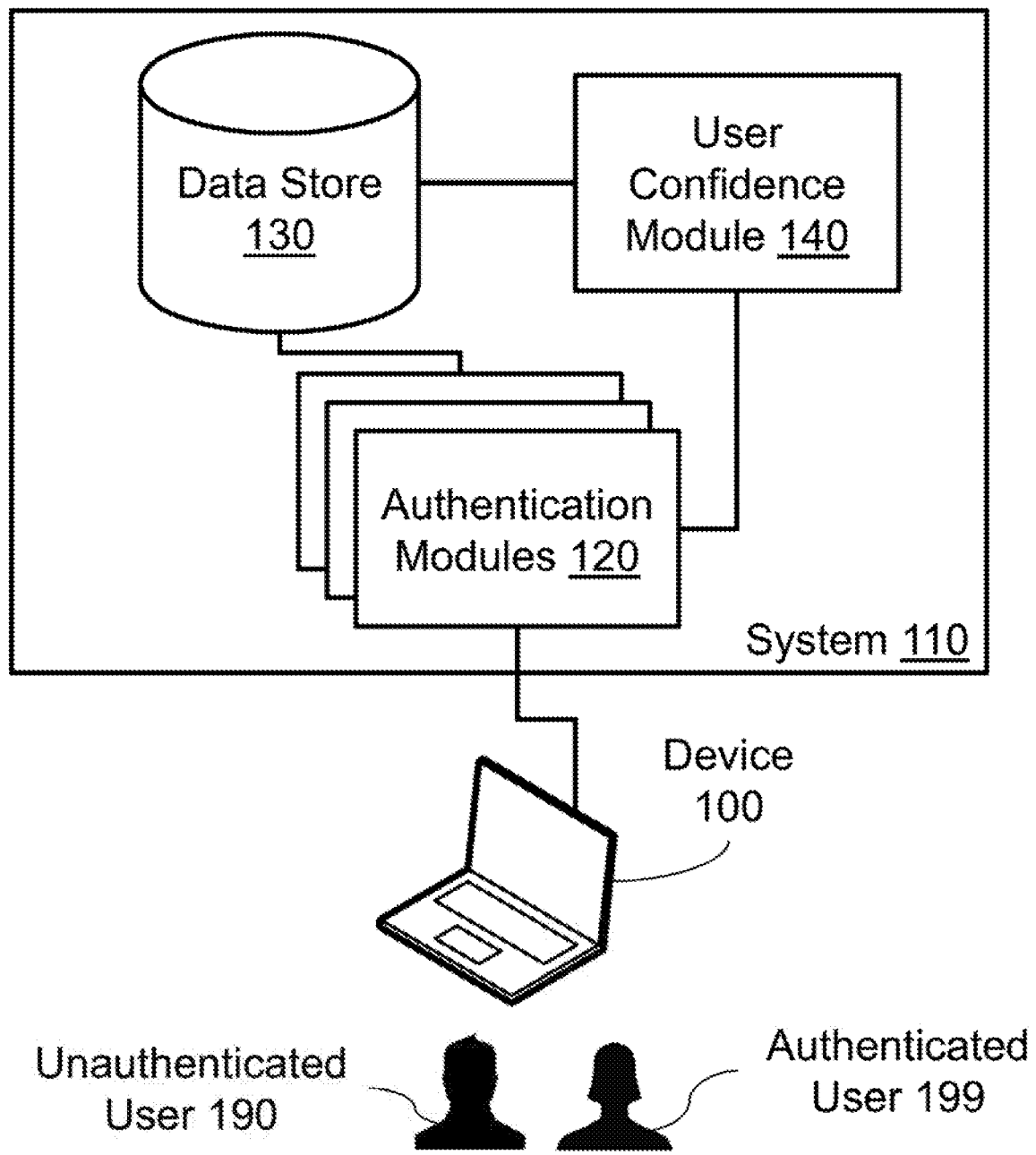
FIG. 1 illustrates an example device associated with user authentication.

FIG. 1 illustrates an example device associated with user authentication. It should be appreciated that the items depicted in FIG. 1 are illustrative examples, and many different systems, devices, and so forth, may operate in accordance with various examples.

FIG. 1 illustrates a device 100 associated with user authentication. In this example, device 100 is illustrated as a laptop computer, though in other examples device 100 could be a desktop computer, a mobile device (e.g., a phone, a tablet), or another type of device for which it is desirable to be able to continuously evaluate whether a current user of the device is an authenticated user 199 of the device.

Example techniques described herein seek to ensure uninterrupted usage of device 100 by an authenticated user 199, and seek to prevent usage of device 100 by an unauthenticated user. As used herein, authenticated user 199 may be a user who owns device 100, a user who operates device 100 with permission of an owner of device 100 (e.g., a company device), or other user who has permission to use device 100. In various examples, authenticated user 199 may have an account registered with device 100 and obtains initial access to device 100 or a resource thereon using some form of authentication technique that unlocks device 100 or the resource. This authentication technique may rely on, for example, a password known to authenticated user 199 (e.g., a text password, a personal identification number, a voice password), a biometric unique to authenticated user 199 (e.g., a fingerprint, facial features, an iris image), a security device held by authenticated user 199, and so forth.

While device 100 is in use, device 100 may seek to ensure that the current user of device 100 remains authenticated user 199, and is not, for example, unauthenticated user 190. Consequently, device 100 may rely on a system 110 to periodically or continuously perform checks to ensure the current user remains authenticated user 199. As used herein, a current user of the device refers generally to whichever person happens to be using a device at a given time. Consequently, a current user of the device could hypothetically change over the course of a claimed system or method if a person operating the device changes. If system 110 detects there is no current user for an extended period of time, system 110 may automatically lock device 100 to preserve security, power, and so forth.

System 110 contains a set of authentication modules 120. These authentication modules 120 may use various components of device 100 to collect data that identifies whether authenticated user 199 remains the current user of device 100. By way of illustration, authentication modules 120 may include, for example, typing analysis modules that analyze characteristics of inputs received through a keyboard of device 100, tapping analysis modules that analyze characteristics of inputs received through a touch input device 100, mouse usage analysis modules that analyze characteristics of inputs received through a mouse connected to device 100, face recognition modules that use a camera of device 100, voice recognition modules that use a microphone of device 100, fingerprint recognition modules, device detection modules that recognize a presence of devices present in an environment surrounding device 100 or carried by authenticated user 199, location detection modules that detect a geographic location of device 100, password receipt modules, and so forth.

System 110 also contains a data store 130. Data store 130 may store a variety of ratings for the authentication modules 120. These ratings may include, for example, disruption ratings for members of the set of authentication modules 120. The disruption ratings may describe how likely authentication modules 120 are to interrupt a user operating device 100. The disruption ratings may factor in resource usage of authentication modules 120, whether an authentication modules 120 prompts the user to perform a task such as entering a password, and so forth. In some examples resource usage of authentication modules 120 may be described in a separate rating stored in data store 130. Resource usage ratings may be based on processor usage, memory usage, device component (e.g., keyboard, camera) usage, and so forth of authentication modules 120.

Data store 130 may also store privacy ratings for authentication modules 120. The privacy ratings may describe how invasive an authentication module is to a user's privacy. For example, entering a password may not be considered to be invasive because it is expected that authenticated user 199 know the password to be able to access device 100 to begin with. In another example, analyzing device usage data may be considered moderately invasive because this usage information may be logged and potentially reveal information about authenticated user 199's work habits. Performing facial recognition may be considered highly invasive to a user's privacy if the images are stored (e.g., so that future facial recognition can be performed) and accessible to people who use or control device 100. While several examples of relative privacy ratings are described, it is to be appreciated that the degree to which an authentication module considered to a user's privacy may be a subjective determination and that different privacy ratings could be argued for different authentication modules 120 based on a variety of factors.

In some examples, data store 130 may also include historical data regarding the past usage patterns of device 100 by authenticated user 199. This data may be used by authentication modules 120 to compare current usage patterns against the historical data. For example, if the authentication modules 120 include a typing analysis module, the historical data may include data describing typing patterns of authenticated user 199 from past sessions such as typing speed, rhythm, and so forth. If the authentication modules 120 include a facial recognition module, the historical data may include a prior photo, facial geometry ratios, and so forth.

To determine which authentication modules 120 to use, system 110 may use a user confidence module 140. User confidence module 140 may maintain a confidence rating that describes a likelihood that a current user of device 100 is authenticated user 199. Based on the user confidence rating and the various ratings in data store 130, user confidence module 140 may control execution of authentication modules 120. Specifically, when the confidence rating indicates there is a relatively higher likelihood that the current user of device 100 is authenticated user 199, user confidence module 140 may control execution, based on the ratings from data store 130, of relatively less disruptive, privacy invasive, resource intensive, and so forth authentication modules 120. As the confidence rating falls, and user confidence module 140 believes it is less likely that the current user of device 100 is authenticated user 199, user confidence module 140 may control execution of more disruptive, and so forth authentication modules 120.

For example, consider a scenario where data store 130 considers a typing analysis module to have a relatively low disruption rating and relatively low privacy rating, a facial recognition module to have a relatively low disruption rating and a relatively high privacy rating, and a password module to have a relatively very high disruption rating and a relatively low privacy rating. Initially, after authenticated user 199 obtains an initial access to device 100, user confidence module 140 can be confident that the current user of device 100 is authenticated user 199 and control execution of the typing analysis module. The typing analysis module may compare current typing patterns (e.g., speed, rhythm, bigrams) to historical data of authenticated user 199. While the current user of device 100 is authenticated user 199, the current typing patterns may fall within acceptable margins of error when compared against the historical data for authenticated user 199. If, however, unauthenticated user 190 is the current user of device 100, the typing analysis module may begin to provide results that indicate that the current user of device 100 is not authenticated user 199. This may cause the confidence rating maintained by user confidence module 140 to begin to fall.

Eventually, the confidence rating may fall past a threshold causing user confidence module 140 to activate a stronger authentication technique than the typing analysis module. In this example, user confidence module 140 may next rely on facial recognition module and use a camera of device 100 to take a picture of the current user of device 100. If the current user is authenticated user 199, user confidence module 140 may raise the confidence rating and proceed back to using the less privacy invasive typing analysis module. In some examples, this may cause user confidence module to store some historical data regarding the recent typing patterns of authenticated user 199 to aid the typing analysis module in identifying the typing habits of authenticated user 199.

However, if the facial recognition module indicates that unauthenticated user 190 is the current user of device 100, user confidence module 140 may further reduce the user confidence rating. In this example, further lowering of the user confidence rating may trigger activation of an even more invasive or disruptive authentication module, such as the password module. The password module may prevent continued usage of device 100 until the device receives a password known by authenticated user 199.

In some examples, user confidence module 140 may also select authentication modules 140 based on a current usage pattern of device 100. The current usage pattern of device 100 may incorporate, for example, movement of device 100, applications being run on device 100, a location of device 100, methods of input being used by the current user of device 100, and so forth. For example, if the current user of device 100 is currently using an application to watch a movie on device 100, device 100 may not have access to typing data for analysis by a typing analysis module. Consequently, if the confidence rating indicated a high likelihood the current user of device 100 is authenticated user 199 when the current user began watching the movie, device 100 may maintain the confidence rating until the current user once again begins actively interacting with device 100. In an alternative, user confidence module 140 may activate a different authentication module 120 (e.g., a facial recognition module) that does not rely on active inputs to device 100. In another example, if a motion tracker detects a sudden, jerking motion of device 100 while device 100 is in a public space, confidence module 140 may suspect a theft of device 100 and attempt to restrict access to the contents of the device.

It is appreciated that, throughout this description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
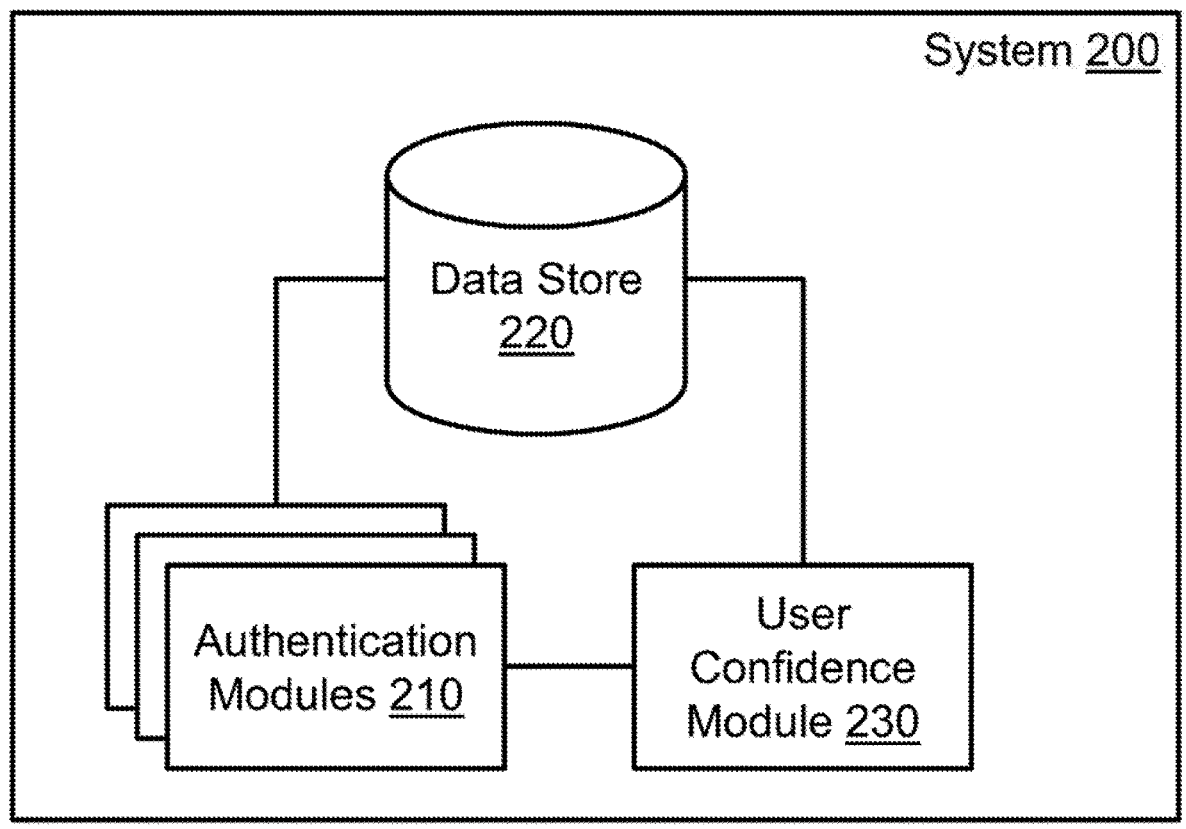
FIG. 2 illustrates an example system associated with user authentication.

FIG. 2 illustrates a system 200. System 200 may be embedded in a device. The device may be, for example, a personal computer (e.g., laptop, desktop), a mobile device (e.g., cell phone, tablet), and so forth. In various examples, different components of system 200 may be controlled or executed by a processor of the device. System 200 includes a set of authentication modules 210. The set of authentication modules 210 may include, for example, typing analysis modules, tapping analysis modules, trackpad analysis modules, mouse usage analysis modules, face recognition modules, voice recognition modules, fingerprint recognition modules, device detection modules, password modules, location detection modules, and so forth.

System 200 also includes a data store 220. Data store 220 may store data describing disruption ratings of members of the set of authentication modules 210. In some examples, data store 220 may also store historical data associated with members of the set of authentication modules 210. The historical data may be used by authentication modules 210 to compare current usage patterns to historical usage patterns, and so forth.

System 200 also includes a user confidence module 230. User confidence module 230 may maintain a confidence rating. The confidence rating may describe a likelihood that a current user of a device is an authenticated user of the device. User confidence module 230 may also control execution of authentication modules 210 based on the confidence rating and based on the disruption ratings of the authentication modules. User confidence module 230 may control execution of a relatively less disruptive authentication module when user confidence module 230 is confident that the current user of the device is the authenticated user of the device. User confidence module 230 may maintain the confidence rating based on feedback received from authentication modules 210. When the confidence rating reaches a known threshold, user confidence module may restrict access to the device.

In some examples, user confidence module 230 may also control execution of authentication modules based on a current usage pattern of the device. The current usage pattern of the device may incorporate, for example, a running application, an input method being performed, positioning information, environmental information, movement information, and so forth. For example, depending on components of the device being used by the current user, different authentication techniques may or may not produce usable results. For example, if the current user of the device is watching a movie, the current user may not be regularly interacting with the device in a manner capturable by a typing analysis module. However, a facial recognition module may be able to see if the user watching the movie is the authenticated user of the device, or a proximity module may detect whether the authenticated user's cell phone is within proximity to the device. In other examples, authentication techniques may be selected based on the sensitivity of data being accessed by the current user of the device. By way of illustration, if the movie is considered to be non-sensitive data (e.g., because it is streamed from a public website), user confidence module 230 may forgo or postpone controlling execution of authentication modules 210 until the current user begins using device in a manner that seeks to access sensitive data and/or components of the device.

In some examples, data store 220 may also store data describing privacy ratings of members of the set of authentication modules 210. In these examples, user confidence module 230 may also control execution of authentication modules 210 based on the privacy ratings. Thus, user confidence module 230 may control execution of a relatively less privacy invasive authentication module when user confidence module 230 is confident that the user of the device is the authenticated user of the device.

Similarly, data store 220 may also store data describing resource consumption ratings for members of the set of authentication modules 210. Accordingly, user confidence module 230 may also control execution of authentication modules 210 based on the resource consumption ratings. This may cause user confidence module 230 to control execution of relatively less resource intensive authentication modules 210 when user confidence module 230 is confident that the current user of the device is the authenticated user of the device.

Figure 3:
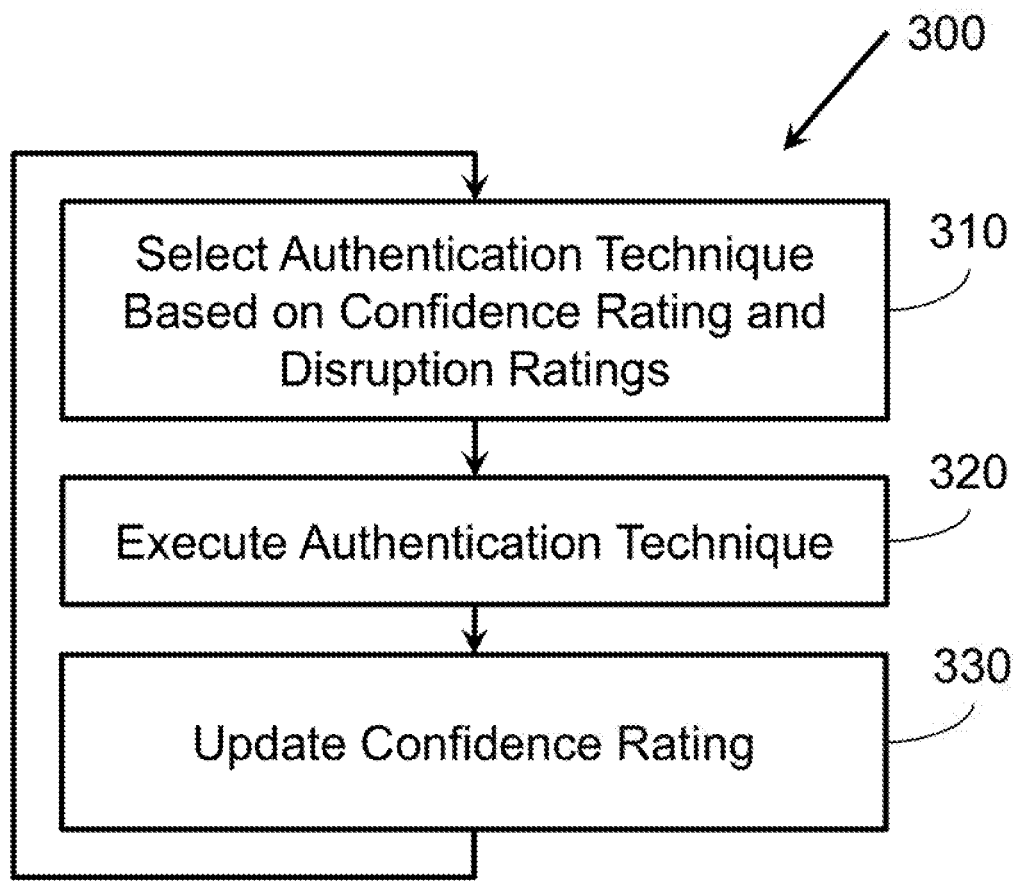
FIG. 3 illustrates a flowchart of example operations associated with user authentication.

FIG. 3 illustrates an example method 300. Method 300 may be embodied on a non-transitory processor-readable medium storing processor-executable instructions. The instructions, when executed by a processor, may cause the processor to perform method 300. In other examples, method 300 may exist within logic gates and/or RAM of an application specific integrated circuit (ASIC).

Method 300 may perform various tasks associated with user authentication. Method 300 may be performed by a processor of a device. In some examples, actions of method 300 may be continuously or repeatedly performed while the device is in use.

Method 300 includes selecting an authentication technique at 310. The authentication technique may be selected from a set of authentication techniques. The authentication technique may be selected to determine whether a current user of the device is an authenticated user of the device. The authentication technique may be selected based on a confidence rating and on disruption ratings for respective members of the set of authentication techniques. Relatively less disruptive authentication techniques may be selected when the confidence rating indicates the current user is the authenticated user.

In some examples, the authentication technique may also be selected based on privacy ratings for respective members of the set of authentication techniques. In these examples, relatively less privacy invasive authentication techniques may be selected at action 310 when the confidence rating indicates the current user is the authenticated user.

Method 300 also includes executing the authentication technique at 320. Executing the authentication technique may involve using device resources to obtain data about the current user or the manner in which the current user is operating the device. This data may then be compared to historical data to provide data describing a likelihood the current user's usage pattern matches historical patterns of device usage. Method 300 also includes updating the confidence rating at 330. The confidence rating may be updated based on a result received from the authentication technique executed at action 320. The result may indicate a likelihood the current user is the authenticated user.

In some examples, certain authentication techniques may compare current input patterns to historical input patterns associated with the authenticated user. When the confidence rating indicates the current user is the authenticated user, method 300 may include updating these historical input patterns (not shown).

In some examples, multiple authentication techniques may be selected at action 310. In these examples, results received from the multiple authentication techniques may be used to update the confidence rating at action 430.

Figure 4:
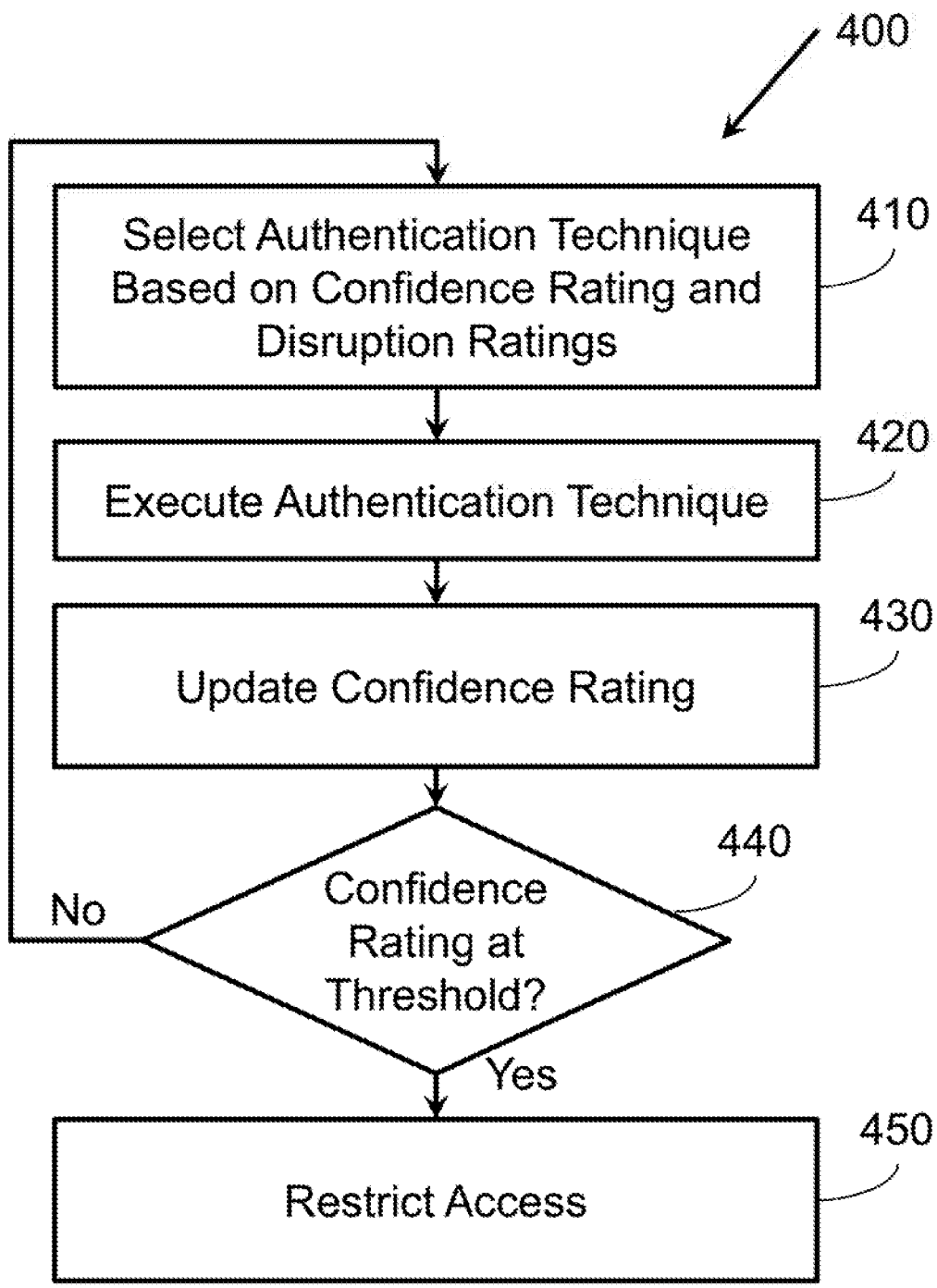
FIG. 4 illustrates another flowchart of example operations associated with user authentication.

FIG. 4 illustrates a method 400 associated with user authentication. Method 400 includes several actions similar to those described above with reference to method 300 (FIG. 3). For example, method 400 includes selecting an authentication technique based on a confidence rating and disruption ratings at 410, executing the authentication technique at 420, and updating the confidence rating at 430.

Method 400 also includes determining whether the confidence rating has reached a known threshold at 440. If the confidence rating has not reached the known threshold, method 400 may proceed to action 410 and continue performing the actions described above until the confidence rating is found to have reached the known threshold at action 440, or some other event interrupts method 400 (e.g., a power down of the device performing method 400, a manual access restriction to the device).

When the confidence rating is found to have reached the known threshold at action 440, method 400 may proceed to action 450 and restrict access. In some examples, access to the entire device performing method 400 may be restricted. Access may be regained by, for example, the authenticated user re-authenticating themselves by entering a password or performing some other authenticating action. In other examples, access to one or more specific resources available to the device may be restricted when the confidence rating reaches the known threshold. This may allow, for example, a parent to let their child browse the internet on a computer while preventing the child from accessing or damaging sensitive files on the computer.

Figure 5:
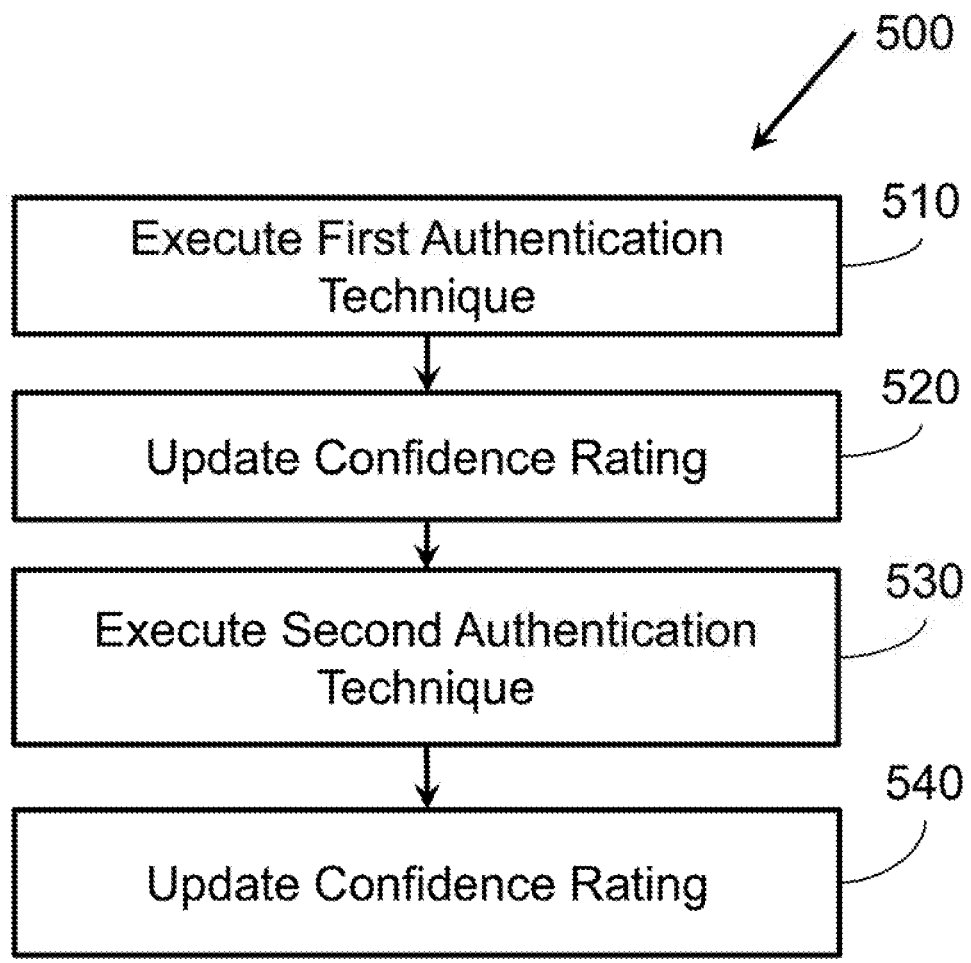
FIG. 5 illustrates another flowchart of example operations associated with user authentication.

FIG. 5 illustrates a method 500 associated with user authentication. While FIG. 5 illustrates two layers of authentication techniques, it is to be appreciated that actions may be continuously performed for a larger number of layers of authentication techniques. Method 500 includes executing a first authentication technique at 510. The first authentication technique may be selected from a set of authentication techniques. The first authentication technique may be used for determining whether a current user of a device is an authenticated user of the device. The first authentication technique may be selected based on a confidence rating describing a likelihood the current user of the device is the authenticated user of the device. The first authentication technique may also be selected based on disruption ratings for members of the set of authentication techniques. The first authentication technique may also be selected based on a first current device usage pattern. A current device usage pattern may be information describing a current manner by which a current user is operating the device. The device usage pattern may include, for example, movement of the device, applications being run on the device, a location of the device, methods of input being used by the current user of the device, and so forth.

Method 500 also includes updating the confidence rating at 520. The confidence rating may be updated based on a result received from the first authentication technique.

Method 500 also includes executing a second authentication technique at 530. The second authentication technique may also be used for determining whether the current user of the device is the authenticated user of the device. The second authentication technique may be selected based on the updated confidence rating, the disruption ratings, and on a second current device usage pattern. When the updated confidence rating was updated to indicate a decreased likelihood that the current user is the authenticated user, an authentication technique that is relatively more disruptive than the first authentication technique may be selected to be the second authentication technique.

Method 500 also includes updating the confidence rating at 540. The confidence rating may be updated based on a result received from the second authentication technique.

In some examples, the first authentication technique may and the second authentication technique may be selected based on sets of ratings for respective members of the authentication techniques. The sets of ratings may include, for example, the disruption ratings, privacy ratings, resource usage ratings, and so forth.

Figure 6:
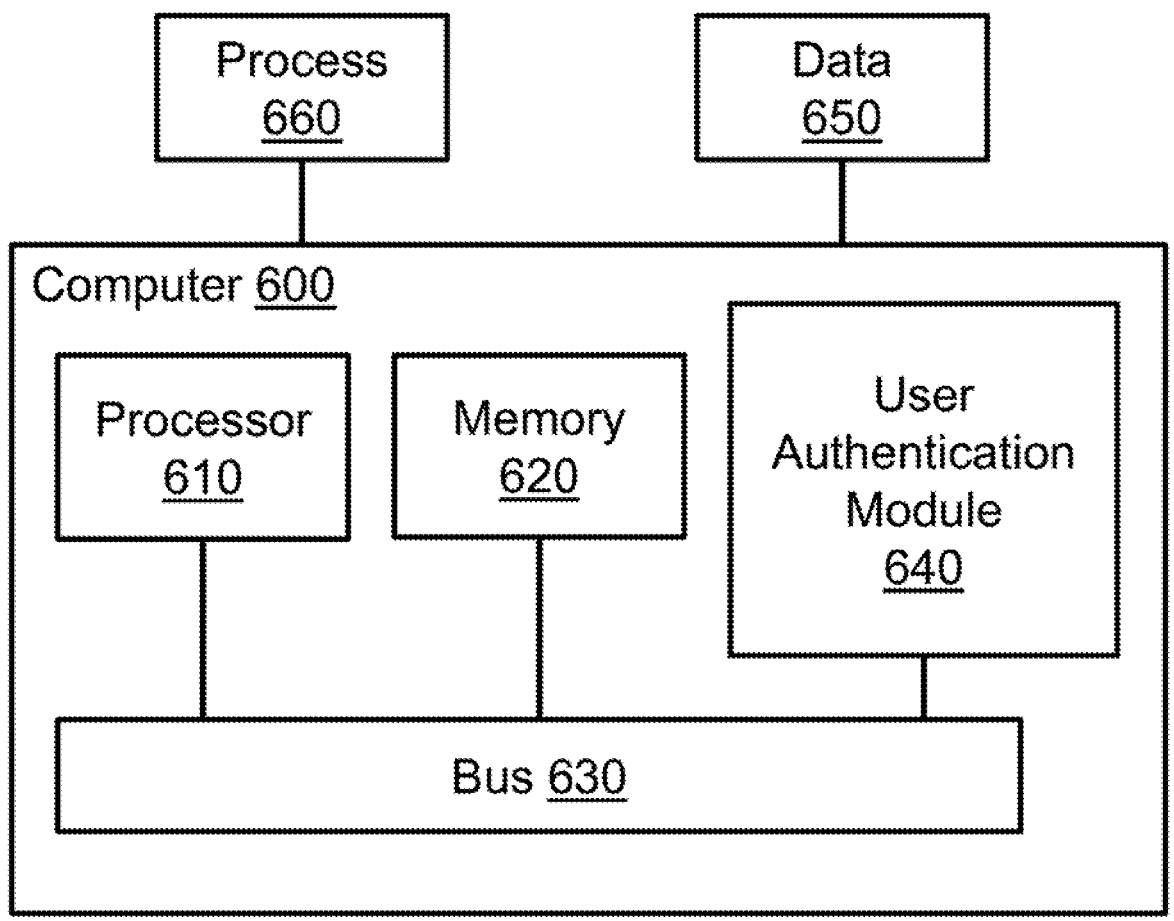
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a user authentication module 640. User authentication module 640 may perform, alone or in combination, various functions described above with reference to the example systems, methods, and so forth. In different examples, user authentication module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read-only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
a plurality of authentication modules;
a data store to store disruption ratings and resource consumption ratings of respective authentication modules of the plurality of authentication modules, wherein the resource consumption ratings comprise a first resource consumption rating indicating a first resource consumption of a resource of a device by a first authentication module of the plurality of authentication modules, and a second resource consumption rating indicating a different second resource consumption of the resource of the device by a different second authentication module of the plurality of authentication modules;
a processor; and
a non-transitory storage medium storing instructions executable on the processor to:
maintain a confidence rating that a current user of the device is an authenticated user of the device, and
in response to the confidence rating, select an authentication module from among the plurality of authentication modules based on the disruption ratings and the resource consumption ratings of the respective authentication modules.

2. The system of claim 1, wherein the plurality of authentication modules comprises one or more of: a typing analysis module, a tapping analysis module, a trackpad analysis module, a mouse usage analysis module, a face recognition module, a voice recognition module, a fingerprint recognition module, a device detection module, a password module, and a location detection module.

3. The system of claim 1, wherein the data store is to further store privacy ratings of the respective authentication modules, and wherein the instructions are executable on the processor to select the authentication module from among the plurality of authentication modules based further on the privacy ratings, wherein a relatively less privacy invasive authentication module is selected responsive to a higher confidence rating that the current user of the device is the authenticated user of the device.

4. The system of claim 1, wherein the instructions are executable on the processor to restrict access to the device responsive to the confidence rating reaching a specified threshold.

5. The system of claim 1, wherein the instructions are executable on the processor to select the authentication module from among the plurality of authentication modules further based on a current usage pattern of the device.

6. The system of claim 5, where the current usage pattern of the device comprises one or more of: a running application, positioning information, environmental information, and movement information.

7. A method comprising:
setting, by a device, a confidence rating related to whether a current user of the device is an authenticated user;
accessing, by the device, resource consumption ratings of respective authentication techniques of a plurality of authentication techniques, wherein the resource consumption ratings comprise a first resource consumption rating indicating a first resource consumption of a resource of the device by a first authentication technique of the plurality of authentication techniques, and a second resource consumption rating indicating a different second resource consumption of the resource of the device by a different second authentication technique of the plurality of authentication techniques;
selecting, by the device, from the plurality of authentication techniques, a selected authentication technique for determining whether the current user of the device is the authenticated user of the device, where the selecting is based on comparing the resource consumption ratings of the respective authentication techniques;
executing, by the device, the selected authentication technique; and
updating, by the device, the confidence rating based on a result received from the selected authentication technique that indicates a likelihood that the current user is the authenticated user.

8. The method of claim 7, comprising restricting access to the device responsive to the updated confidence rating reaching a specified threshold.

9. The method of claim 7, comprising restricting access to a resource available to the device responsive to the updated confidence rating reaching a specified threshold.

10. The method of claim 7, wherein the selecting of the selected authentication technique is further based on privacy ratings for the respective authentication techniques, wherein a relatively less invasive authentication technique is selected responsive to the confidence rating indicating that the current user is the authenticated user.

11. A non-transitory computer-readable medium storing processor executable instructions that when executed cause a system to:
set a confidence rating related to whether a current user of a device is an authenticated user;
access disruption ratings and resource consumption ratings of respective authentication techniques of a plurality of authentication techniques, wherein the resource consumption ratings comprise a first resource consumption rating indicating a first resource consumption of a resource of the device by a first authentication technique of the plurality of authentication techniques, and a second resource consumption rating indicating a different second resource consumption of the resource of the device by a different second authentication technique of the plurality of authentication techniques;
in response to the confidence rating, select an authentication technique from the plurality of authentication techniques, wherein the selecting comprises:
in response to the confidence rating being at a first level, selecting the first authentication technique based on a first disruption rating and the first resource consumption rating of the first authentication technique, wherein the first disruption rating indicates that the first authentication technique is less disruptive than the second authentication technique, and the first resource consumption rating indicates that the first authentication technique consumes less of the resource than the second authentication technique, and
in response to the confidence rating being at a second level lower than the first level, selecting the second authentication technique based on a second disruption rating and the second resource consumption rating of the second authentication technique; and
update the confidence rating based on a result received from the first selected authentication technique.

12. The system of claim 1, wherein the resource comprises one or a combination of a processor, a memory, or an input/output (I/O) device, the first resource consumption rating indicates the first resource consumption of the one or the combination of the processor, the memory, or the I/O device by the first authentication module, and the second resource consumption rating indicates the second resource consumption of the one or the combination of the processor, the memory, or the I/O device by the second authentication module.

13. The system of claim 1, wherein the instructions are executable on the processor to:
in response to the confidence rating being at a first level, select the first authentication module based on a first disruption rating and the first resource consumption rating of the first authentication module, wherein the first disruption rating indicates that the first authentication module is less disruptive than the second authentication module, and the first resource consumption rating indicates that the first authentication module consumes less of the resource than the second authentication module, and
in response to the confidence rating being at a second level lower than the first level, select the second authentication module based on a second disruption rating and the second resource consumption rating of the second authentication module.

14. The system of claim 1, wherein the instructions are executable on the processor to:
update the confidence rating based on comparing an input pattern at the device to a historical input pattern, wherein the input pattern at the device comprises a pattern of one or more of a user typing pattern, a mouse pattern, or a tapping pattern on a touch input device.

15. The system of claim 1, wherein the instructions are executable on the processor to:
select the authentication module from among the plurality of authentication modules further based on a current usage pattern that comprises which of plural applications is running on the device, wherein the selected authentication module does not rely on a user input responsive to the current usage pattern indicating that an application running is one where a user is not actively interacting with an input device.

16. The method of claim 7, comprising:
in response to the confidence rating being at a first level, selecting, by the device, the first authentication technique based on the first resource consumption rating indicating that the first authentication technique consumes less of the resource than the second authentication technique, and
in response to the confidence rating being at a second level lower than the first level, selecting, by the device, the second authentication technique based on the second resource consumption rating.

17. The method of claim 7, comprising:
updating, by the device, the confidence rating based on comparing an input pattern at the device to a historical input pattern, wherein the input pattern at the device comprises a pattern of one or more of a user typing pattern, a mouse pattern, or a tapping pattern on a touch input device.

18. The method of claim 7, comprising:
selecting, by the device, the authentication technique from among the plurality of authentication techniques further based on a current usage pattern that comprises which of plural applications is running on the device, wherein the selected authentication technique does not rely on a user input responsive to the current usage pattern indicating that an application running is one where a user is not actively interacting with an input device.

19. The non-transitory computer-readable medium of claim 11, wherein the instructions when executed cause the system to:
update the confidence rating based on comparing an input pattern at the device to a historical input pattern, wherein the input pattern at the device comprises a pattern of one or more of a user typing pattern, a mouse pattern, or a tapping pattern on a touch input device.

20. The non-transitory computer-readable medium of claim 11, wherein the instructions when executed cause the system to:
select the authentication technique from among the plurality of authentication techniques further based on a current usage pattern that comprises which of plural applications is running on the device, wherein the selected authentication module does not rely on a user input responsive to the current usage pattern indicating that an application running is one where a user is not actively interacting with an input device.

* * * * *